UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

ANTHRAQUINONE DERIVATIVE AND PROCESS OF MAKING SAME.

SPECIFICATION forming part of Letters Patent No. 617,981, dated January 17, 1899.

Application filed December 27, 1897. Serial No. 663,723. (Specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of New Coloring-Matters for Animal Fiber, of which the following is a specification.

In the manufacture of the anthracene blues a nitro-anthraquinone or reduction product therefrom, which I hereinafter designate by the collective term "nitro-anthraquinone body," is treated with fuming sulfuric acid with or without the presence of a reducing agent, such as sulfur, and in this way intermediate coloring-matters are obtained which are soluble in water and possess the chemical character of sulfuric-acid esters. On treatment with water under suitable conditions they yield mixed coloring-matters containing polyoxyanthraquinone sulfo-acids. My present invention relates to the discovery that such sulfuric-acid esters of polyoxyanthraquinone sulfo-acids can be combined with phenolic bodies, including the hydroxycarboxylic and sulfonic acids. The new products thus obtained constitute soluble coloring-matters which dye wool from the acid-bath very well and give violet to blue shades of great brightness, while the initial material before condensation with a phenolic body under similar circumstances only gives brown-red to bordeaux-red shades. If the goods dyed with the new coloring-matters without a mordant be subsequently treated with chrome, greenish-blue to bluish-green shades are obtained.

The condensation with the phenols, as hereinbefore defined, can be effected in various ways. It succeeds best if the aforesaid coloring-matters are applied in the form of their esters with sulfuric or boracic acid. It is therefore advantageous to add the phenolic substance chosen to the reaction mixture obtained by the treatment of the dinitro-anthraquinone with fuming sulfuric acid in the presence of a reducing agent or of this and of boracic acid. The mixture with the phenolic substance is then heated to say about sixty to eighty degrees centigrade for several hours or as long as may be necessary in each case.

The following example will serve to illustrate the manner in which my invention can best be carried into practical effect. The parts are by weight:

Example: Mix about ten (10) parts of 1.5 dinitro-anthraquinone with fifty (50) to one hundred (100) parts of fuming sulfuric acid and one and a half (1½) parts of finely-divided sulfur. The fuming sulfuric acid may contain, for instance, twelve (12) or forty (40) per cent. free anhydrid. Heat the mixture moderately for several hours, but not higher than about one hundred and thirty degrees centigrade, (130° C.) When the coloring-matter is practically completely soluble in water, allow the melt to cool and add at the ordinary temperature about eight (8) parts of gallic acid. Stir the mixture all the time and heat gradually to about fifty (50°) to sixty (60°) degrees centigrade. The melt assumes a brown color, and after about five (5) or six (6) hours the reaction is complete. Allow the melt to cool, pour it into ice-water, precipitate with common salt, and collect in the usual way.

In the dry state the new coloring-matter is a black powder readily soluble in water. Instead of gallic acid other phenols or sulfo-phenols or carboxyphenols or their derivatives can be used.

In the following table the properties of some of the new coloring-matters are stated:

| Phenolic body employed. | Per cent. of SO₃ in acid used. | Solution in water. | Soda. | Caustic soda. | Concentrated sulfuric acid. | Color. On wool, no mordant. | Color. After chroming. |
|---|---|---|---|---|---|---|---|
| Gallic acid | 12 | Blue-violet | Blue | Blue-green | Red-brown | Violet | Blue-green. |
|  | 40 | Blue | Blue | Green | Olive-green | Blue-violet | Green. |
| Pyrogallol | 12 | Blue-violet | Blue | Dirty-blue green. | Dirty olive | Blue-violet | Green-blue. |
|  | 40 | Blue | Greenish blue | Green-blue | Olive-green | Blue-violet | Green. |
| Resorcin | 12 | Blue | Green-blue | Green-blue | Dirty olive | Violet | Greenish blue. |
|  | 40 | Blue | Pure blue | Pure blue | Pure blue | Bluish violet | Blue-green. |
| Phenol | 12 | Violet | Blue | Green-blue | Yellow-brown | Red-violet | Greenish blue. |
|  | 40 | Blue | Blue | Pure blue | Olive-green | Blue | Green-blue. |
| Alpha-naphthol | 12 | Blue | Blue | Pure blue | Dirty olive | Violet | Green-blue. |
|  | 40 | Blue | Blue | Greenish blue | Olive-green | Blue | Green. |
| Beta-naphthol | 12 | Violet | Green-blue with greenish fluorescence. | Blue-green with green fluorescence. | Brown-yellow | Violet | Green-blue. |
|  | 40 | Violet-blue | Blue | Green-blue | Olive-green | Violet-blue | Green-blue. |
| B,B₄ dihydroxynaphthalene | 12 | Violet | Blue | Blue-green | Olive | Violet | Greenish blue. |
|  | 40 | Blue | Blue | Green-blue | Olive-green | Violet-blue | Blue-green. |
| Beta-naphthol sulfo-acid (Schaeffer). | 12 | Blue-violet | Blue | Green-blue | Brown | Reddish violet | Greenish blue. |
|  | 40 | Blue | Blue | Green-blue | Olive-green | Violet-blue | Blue-green. |

The method of production is essentially the same for all these coloring-matters. The temperatures, the proportions of the phenolic bodies used, strength of fuming acid, &c., can be varied considerably. Also instead of pure 1.5 dinitro-anthraquinone crude dinitro-anthraquinone, such as is obtained by nitrating anthraquinone, can be used.

What I claim as new, and desire to secure by Letters Patent, is—

1. The process for the production of new coloring-matters by condensing sulfuric-acid esters of a polyoxyanthraquinone sulfo-acid, which can be obtained by the treatment of a nitro-anthraquinone substance, as hereinbefore defined with fuming sulfuric acid, with a phenolic substance as hereinbefore defined, all substantially as hereinbefore described.

2. The process for the production of new coloring-matter by condensing the sulfuric-acid esters of a polyoxyanthraquinone sulfo-acid, which can be obtained by the treatment of a nitro-anthraquinone substance as hereinbefore defined, with fuming sulfuric acid and a reducing agent hereinbefore defined, with a phenolic substance, such as hereinbefore defined, all substantially as hereinbefore described.

3. As a new article of manufacture, the coloring-matter which can be obtained substantially as described from a nitro-anthraquinone substance, and which dissolves in water, giving a violet to blue color; dyes unmordanted wool violet to blue shades, which on subsequent treatment with chrome become greenish blue to blue; with caustic soda the coloring-matter gives green to blue and with carbonate of soda it gives greenish blue to blue all substantially as described.

4. As a new article of manufacture the coloring-matter which can be obtained by combining the product, resulting by the action of fuming sulfuric acid of forty per cent. SO₃ on 1.5 dinitro-anthraquinone, with gallic acid as hereinbefore defined and which is a black powder, soluble in water with a blue color, by addition of caustic soda it becomes green; concentrated sulfuric acid dissolves it with an olive-green color, all substantially as hereinbefore described.

In testimony whereof I have hereunto set my hand in the presence of two subscribing witnesses.

OSCAR BALLY.

Witnesses:
GUSTAV L. LICHTENBERGER,
BERNHARD C. HESSE.